United States Patent [19]

Barnea

[11] Patent Number: 5,124,734
[45] Date of Patent: Jun. 23, 1992

[54] OPTHALMIC LENS

[76] Inventor: Daniel Barnea, 1 Ugarit Street, Tel Aviv 69016, Israel

[21] Appl. No.: 500,508

[22] Filed: Mar. 28, 1990

Related U.S. Application Data

[63] Continuation-in-part of Ser. No. 208,660, Jun. 20, 1988, Pat. No. 4,913,536.

[30] Foreign Application Priority Data

Apr. 13, 1989 [IL] Israel ......................... 89945

[51] Int. Cl.⁵ .......................... G02C 7/06; G02B 3/14
[52] U.S. Cl. ...................................... 351/169; 351/41; 351/159; 359/666
[58] Field of Search .......... 351/159, 41, 158, 168–172; 350/418, 419; 359/666

[56] References Cited

U.S. PATENT DOCUMENTS

| | | | |
|---|---|---|---|
| 2,576,581 | 11/1951 | Edwards | 350/419 X |
| 2,836,101 | 5/1958 | Deswart | 350/419 |
| 3,161,718 | 12/1964 | De Luca | 350/419 |
| 3,493,290 | 2/1970 | Traub | 350/419 X |
| 3,598,479 | 8/1971 | Wright | 350/419 X |
| 4,261,655 | 4/1981 | Honigsbaum | 350/419 X |
| 4,418,990 | 12/1983 | Gerber | 351/41 |
| 4,913,536 | 4/1990 | Barnea | 350/419 |

FOREIGN PATENT DOCUMENTS

| | | | |
|---|---|---|---|
| 55-36857 | 3/1980 | Japan | 350/419 |
| 258325 | 9/1926 | United Kingdom | 350/419 |

OTHER PUBLICATIONS

Graham, R.; "A Variable Focus Lens and It's Uses"; *Journal of the Optical Society of America;* vol. 30; Nov. 1940; pp. 560–563.

*Primary Examiner*—Scott J. Sugarman
*Attorney, Agent, or Firm*—Sandler, Greenblum & Bernstein

[57] ABSTRACT

An ophthalmic lens that includes a construction that provides a static grading or some other means that yields a nonuniform power function which depends on the surface of the lens. The lens also includes a selectively operable element that effects a dynamic change in the power of the lens which is a uniform or nonuniform function of the location point on the lens. The actual power of any point on the lens is then the super position of the power due to static grating and the power due to the selectively operable element. The proper design of each power function facilitates ophthalmic lenses that are suitable and optimized for special applications as well as for general purpose usage.

31 Claims, 2 Drawing Sheets

OPTHALMIC LENS

RELATED APPLICATION

This invention is a continuation in part of copending application U.S. Ser. No. 208,660 filed Jun. 20, 1988, now U.S. Pat. No. 4,913,536, the subject matter of which is hereby incorporated by reference.

TECHNICAL FIELD

This invention relates to an ophthalmic lens, and more particularly to an ophthalmic lens that reduces the need for the wearer to angularly tilt his head to accommodate objects over a range of distances.

BACKGROUND ART

Variable focal length ophthalmic lenses are a great value particularly in the area of eyeglasses or spectacles. The human eye, after a person reaches the mid forties, looses its natural flexibility for focusing on both near and far objects. As a consequence, most people require spectacles to assist them in both reading and long-distance vision. Several products are available for this purpose: reading spectacles, bi-focals spectacles, and multi-focal or progressively graded spectacles; and spectacles with a variable power lenses. Each of these approaches has its own drawbacks. Reading spectacles must be put on before beginning to read, assuming they can be found when needed. Bi-focals allow closeness in viewing but only at restricted low angles which generally require the wearer to tilt his head upwardly to an unnatural position. Progressively graded spectacles allow correction for a continuum of distances, and have the advantage of permitting the user to instantaneously change focus in accordance with a change in viewing angle. With progressively graded lenses, focal distance strictly depends on the direction of viewing which is not necessarily commensurate with environment requirements. The largest power grading starts from the highest power levels at low angles for reading, and becomes gradually lower for higher angles and thus longer distances. Thus, the lens power usually is graded to decrease by up to three diopters from bottom to top angles of viewing. The problem with angle-dependent, progressively graded lenses is best illustrated in the case of near objects positioned at high viewing angles. This dictates an extremely unnatural tilting of the head in order for the user to see the objects well.

In the normal design of progressive graded lenses, the power variation provides for a variation in power for objects at about 30-40 cm. at low viewing angles, to infinity at the most elevated angle. In general, the extent of such a power variation is about 2.5-3 diopters from the lowest to the highest viewing angle. This variation of power as a function of viewing angle, as dictated by any progressive grading technique, is very restrictive because of the objects in an environment viewed by an observer rarely exhibit a spatial positioning that is complementary to the grading. In most scenarios, the line of sight of a near object is lower than that of more distant objects, but this is not always the case. Moreover, even if distribution of distance to objects is monotonic with angle, this distribution function, in a real environment, is likely to exhibit an angle dependency different from the power correction that a given lens may provide for. The best that can be hoped for is a reasonable statistical matching of the rate of change of lens power versus distance distributions of objects in a typical scene.

It is thus obvious for designs of this type, that rapid refocusing from near to far objects will frequently require an inconvenient tilting of the head of the wearer. Such tilting is essential for the eyes to gain a viewing angle for which the lens provide the right power or focal distance.

Spectacles with variable power lenses in which the focal length can be changed in response to the touch of a switch or moving a lever on or near the frame of the glasses, are obviously of potential advantage to a user. U.S. Pat. Nos. 4,261,655 and 4,418,990, and copending application Ser. No. 208,660, now U.S. Pat. No. 4,913,536, disclose fluid-filled flexible lenses which can be adjusted to provide variable power. The flexibility of the materials and the fluid in these lenses permit controlled variation of their focal lengths.

A potential limitation of the spectacles employing variable power lenses is the time required to change the power by the user, as well as the inconvenience for having to effect operation of the apparatus by which the power is changed. Although sub-second switching times are possible, all too frequently changes in the lens power are unacceptable because of user fatigue, or excessive energy drain if the mechanism for effecting changes is automatic.

For glasses with a variable power lens, the power is controllable at any point on the lens. Thus, any object in sight can be brought into focus without the need to tilt the head. However, there are many situations which requires frequent changes in the focus, and the process may become inconvenient due to need for repetitive control activation.

The problems faced by many persons over forty as illustrated in FIG. 1 which shows typical distances and viewing angles for an operator of a video display terminal. In normal use, an operator must continuously shift his line of sight through an angle by about 60°, the distance to an object varying from about 0.4 m. when viewing a keyboard to about 0.55 m. when viewing the screen of the terminal. Maximum variation in power, $DP_{max}$ under these conditions is 0.7 diopters where $DP_{max} = 1/D_s - 1/D_l$, and $D_s$ is the shortest distance to an object and $Dl$ is the longest. Thus, the eye of an operator under these conditions must be able to accommodate a range of 0.7 diopters.

For ordinary desk work $DP_{max}$ is about 1.25 diopters as shown in FIG. 2 wherein the eye is about 0.4 m from a desk surface, and an angular range of about 60° is typical. Progressively graded lenses may be utilized as shown FIG. 3A. Typically, the variation in power is as indicated in FIG. 3B. Variation in power along the vertical axis of the lens ranges from 0 at a 30° upward angle measured from the reference indicated, to about 1.25 diopters at about a 30° downward angle from the reference and aligned with a keyboard, for example. To properly see objects on the floor when a person is standing, $DP_{max}$ is about 0.34 diopters as shown in FIGS. 4A and 4B.

From the above discussion one can see that a wide variation in power is required for a person to properly see a computer keyboard on a desk, the screen of a video terminal, and to see across a room.

An object of the present invention is to provide an improved ophthalmic lens which minimizes the drawbacks described above.

BRIEF DESCRIPTION OF THE INVENTION

The present invention provides an ophthalmic lens having a reference axis comprising static progressive grading means for establishing a power for the lens that is a non-uniform function of location along the reference axis. Dynamic means are provided for selectively changing the power of the lens along at least a major portion of the reference axis independently of the static means such that the actual power at a given point on the reference axis is the superposition of the power due to the static grading means and the power due to the setting of the dynamic means.

If the static grading means is progressive, a user at a computer terminal, for example, may conveniently glance down to the keyboard, and up to the screen, and maintain each component in focus by reason of the progressive grading. When the user glances beyond the screen to a more distant object, a manual setting of the dynamic means is involved in order to achieve proper focus.

BRIEF DESCRIPTION OF DRAWINGS

An embodiment of the present invention is shown by way of example in the accompanying drawings wherein.

DETAILED DESCRIPTION

Figure 5A:
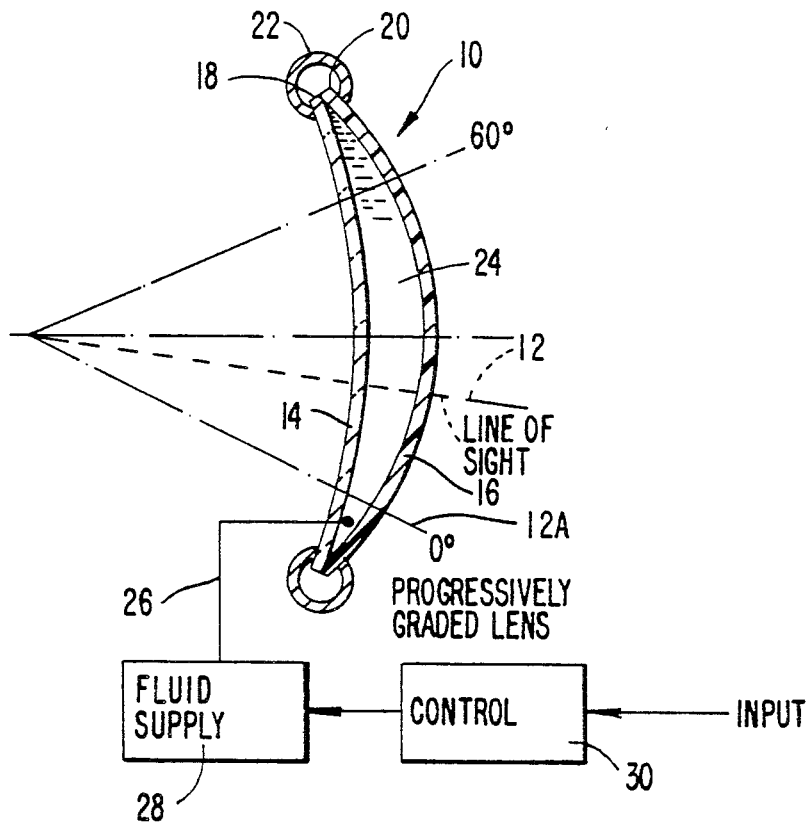
FIG. 5A is a cross-section through a lens according to the present invention.

Referring to. FIG. 5A, reference numeral 10 designates a ophthalmic lens according to the present invention having a reference axis that is vertically oriented and lies in the plane of the drawing. Typically, the user of the lens has about a 60° viewing angle as indicated. A typical line of sight for the user is indicated by broken line 12. The lens includes what is termed a reference axis which is a vertical line lying in the plane of the paper showing FIG. 5A.

Lens 10 may comprise a pair of flexible membranes 14 and 16 having peripheral edges 18, 20 respectively which contact each other as shown in FIG. 5A. The peripheral edges of the flexible membranes are clamped together by circular c-clamp 22 in the manner disclosed in application Ser. No. 208,660 filed Jun. 20, 1988 now U.S. Pat. No. 4,913,536. While the membranes may be of uniform thickness, the present invention contemplates the possibility that the membranes are of non-uniform thickness, or the clamping arrangement is non-uniform so that the power of the lens due to changes in curvature of the membranes is non-uniform.

Optical fluid 24 is contained between membranes 14 and 16, the fluid being connected via conduit 26 to fluid supply 28. Control 30 associated with fluid supply 28 permits the input to control 30 to establish the volume of fluid contained between the membranes thereby controlling the power of the lens 10. As described in application Ser. No. 208,660 referred to above, practically any desired range of power can be achieved. The above discussion of lens 10 is merely a summary of the subject matter contained in application Ser. No. 208,660, now U.S. Pat. No. 4,913,536 the apparatus shown in FIG. 5A being merely a schematic representation of the invention in the above-mentioned application.

In accordance with the present invention, lens 10 has, in addition to the dynamic means described above for selectively changing the power of the lens along a major portion of the reference axis, static grading along the axis is provided. Such grading may be progressive, or it may be in discrete steps such as found in bi- or tri-focal spectacles. In either case, membranes 14 and 16 are designed to establish a power for the lens that is a non-uniform function of the distance along the reference axis. When the static grading is progressive, membranes 14 and 16 provide a variation in power that follows a curve as indicated schematically in FIG. 5B by reference numeral 30. That is to say, the power at a 0° viewing angle, typically, may be about 1 diopter, the power changing with viewing angle according to curve 30 and reaching the value of 0 at about 60°. A larger or smaller range can also be used, however.

In operation, a user sitting at a video terminal, for example, would provide an input to control 30 until the shape of lens 10 has been changed to a configuration which permits the user to focus on the keyboard. By reason of the progressive grading of the lens, the user is able to focus clearly on the keyboard as well as on the screen of the video terminal. The actual change in power along the reference axis of the lens may generally follow the curve shown by reference numeral 32 in FIG. 5B when the line of sight is line 12.

When the user wishes to view an object located at a distance greater than the screen, an input is applied to control 30 which causes fluid supply 28 to inject fluid between the membranes for the purpose of changing the shape thereof. The input is maintained until the shape of the lens is such as to provide the proper focus for the observer along the line of sight. Typically, for a line of sight along the line 12 shown in FIG. 5A, the variation in power of the lens would be as indicated by curve 30. Thus, the power of the lens has two components: one component being the power due to the flexibility of the lens, and the other being the power due to the progressive grading thereof. The actual power at a give point on a reference axis of the lens is thus the superposition of the power due to the curvature of the membranes and the power due to the progressive grading of the lens. It should be understood that the power variation along the axis parallel to the reference axis, but displaced laterally thereof, may be the same as the power variation along the reference axis, or it may be different in accordance with the particular visual requirements of the viewer.

Figure 1:
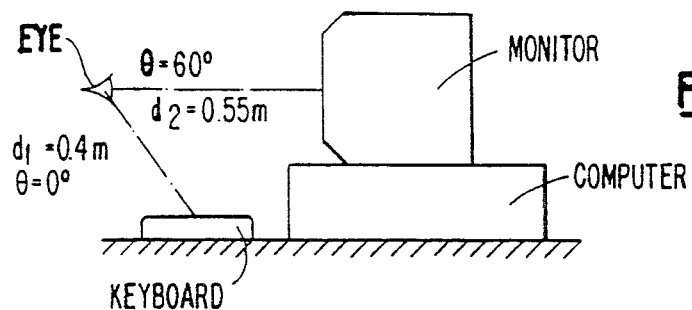
FIG. 1 is a side view, in schematic form, of a video data terminal having a keyboard, computer and a monitor.
Figure 3A:
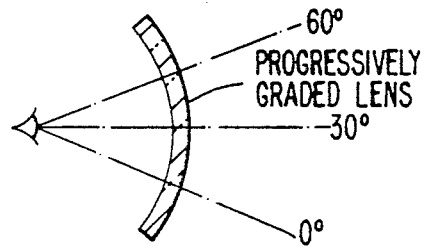
FIG. 3A is a vertical section through a progressively graded lens for the purpose of showing the range of angularity of the line of sight through the lens.
Figure 2:
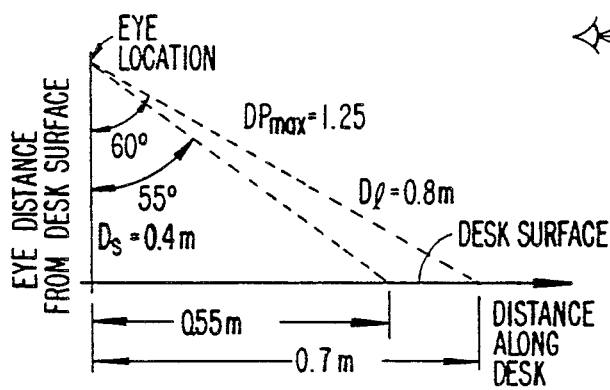
FIG. 2 is a graph showing the distances from an eye to objects on a desk positioned before an observer.
Figure 3B:
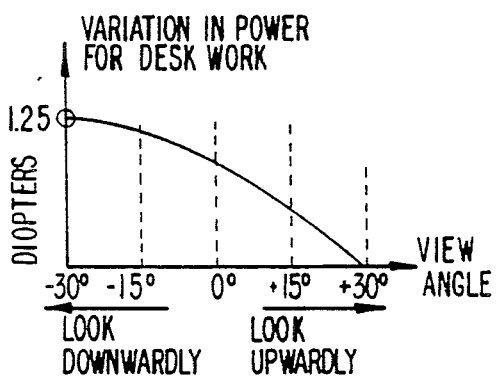
FIG. 3B is a graph showing a typical variation in power of a progressively graded lens.
Figure 4A:
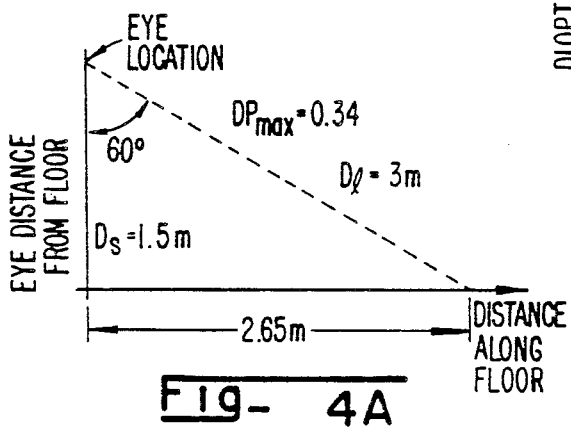
FIG. 4A is a graph showing the distances involved for a person standing and looking ahead at an angle of 60°.
Figure 4B:
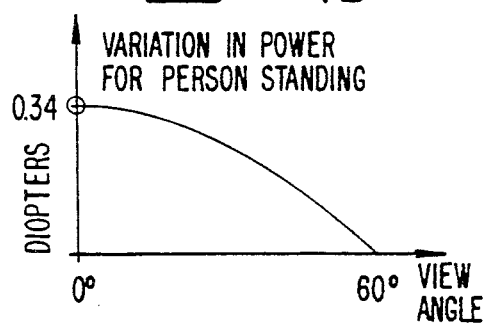
FIG. 4B is a variation in power required for a situation like that shown in FIG. 4A.
Figure 5B:
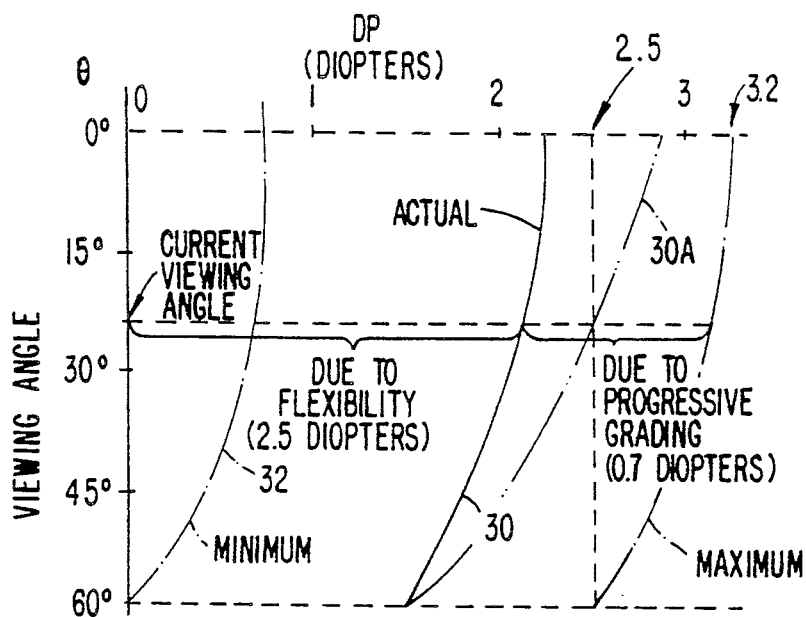
FIG. 5B is a graph showing the variation in diopters as a function of viewing angle through the lens shown in FIG. 4A.

For typical arrangements, as described above dealing with reading, operating a computer terminal, and looking at more distant objects, it is clear that the maximum power variation over the range of the lens or over the angular domain of the lens which is termed $DP_{max}$, is less than about 1.0 diopters. Therefore, the preferred embodiment of the present invention would advantageously utilize a basic progressive grading with a $DP_{max}$ value less than about 0.9 and more than about 0.2 diopters. A compromise value is about 0.7 diopters which is the value shown in FIG. 1 for conveniently operating a video data terminal. Thus, for a video data terminal operator, spectacles having the following characteristics would be useful: $DP_{max} = 0.7$ diopters with a vertical angle distribution as shown in FIG. 5B, and a superposition power variation capability plus or minus 1.25 diopters. Preferably, control 30 and lens 10 would be effective to achieve a full range change in power variation in less that one second.

Spectacles with the above combination of parameters will allow the user to work continuously with relatively infrequent power switching activity and still have the capability of focusing on objects at much greater distances. In such case, the user will need only a single pair of spectacles for all of his activities.

While FIG. 5B shows an arrangement in which the dynamic means for selectively changing the power of the lens is such that the power changes uniformly (i.e., curve 32 at one setting is parallel to curve 30 at another setting), the present invention also contemplates a non-uniform change in power when the dynamic means is operated. In other words, power distribution curve 32 may have the form indicated by reference numeral 30A instead of 30.

The advantages and improved results furnished by the method and apparatus of the present invention are apparent from the foregoing description of the preferred embodiment of the invention. Various changes and modifications may be made without departing from the spirit and scope of the invention as described in the appended claims.

I claim:

1. An ophthalmic lens having a reference axis comprising:
   a) static means for establishing a power for the lens that is a non-uniform function, on the lens area, of distance along said axis; and
   b) dynamic means for selectively changing the power of the lens along at least a major portion of said axis independently of said static means such that the actual power of the lens at a given point along said axis is the superposition of the power due to said static means and the power due to said dynamic means.

2. An ophthalmic lens according to claim 1, wherein said static means is constructed and arranged such that its maximum power less its minimum power is less than about 1.0 diopters.

3. An ophthalmic lens according to claim 2 wherein said static means is constructed and arranged such that its maximum power less its minimum power is about 0.0 diopters.

4. An ophthalmic lens according to claim 3 wherein said maximum power less its minimum power is greater than about 0.2 diopters.

5. An ophthalmic lens according to claim 1 wherein said static means is constructed and arranged such that its maximum less its minimum power is in range of about 0.2 to 0.9 diopters.

6. An ophthalmic lens according to claim 4 wherein said maximum power less its minimum power is about 0.7 diopters.

7. An ophthalmic lens according to claim 1 wherein said dynamic means is constructed and arranged such that it achieves a variation of about 2 diopters.

8. An ophthalmic lens according to claim 1 wherein the maximum range is about plus or minus 1.25 diopters.

9. An ophthalmic lens according to claim 1 wherein said static means is constituted by a progressive grading of the power of the lens along said axis.

10. An ophthalmic lens according to claim 1 wherein said static means is constituted by a plurality of discrete steps in the power of the lens along said axis.

11. An ophthalmic lens according to claim 1 wherein said static means is constructed and arranged such that the power distribution of the lens due to said static means along an axis transverse to said reference axis is non-uniform.

12. An ophthalmic lens according to claim 1 wherein the dynamic means is constructed and arranged so that the change in optical power along said axis is uniform.

13. An ophthalmic lens according to claim 1 wherein the dynamic means is constructed and arranged so that the change in power along said axis is non-uniform.

14. An ophthalmic lens according to claim 1 wherein said lens includes a pair of membranes attached at their peripheral edges, and an optical fluid interposed between said membranes and means for controlling the pressure of fluid interposed between said membranes.

15. An ophthalmic lens according to claim 14 wherein said membranes have the shape that provides a uniform static power function.

16. An ophthalmic lens according to claim 14 wherein said membranes are constructed and arranged so that the change in power along said axis is non-uniform.

17. An ophthalmic lens comprising:
   (a) static means for establishing a non-uniform power function for the lens over a selected area of the lens surface; and
   (b) dynamic means for selectively changing the power function of the lens independently of the power function established by said static means, such that the actual power of the lens at a given point thereon is the superposition of the power due to said static means and the power due to said dynamic means.

18. A lens according to claim 17, wherein the power function achieved by said dynamic means is uniform over said area.

19. A lens according to claim 17, wherein the power function achieved by said dynamic means is non-uniform over said area and may be zero for some regions of said selected area.

20. A lens according to claim 17, wherein said static means comprises means for achieving a combination of step-wise changes in power over said area and gradual power changes.

21. A lens according to claim 17, wherein the maximal power difference due to the static means, between any pair of points in said area, is fixed.

22. A lens according to claim 17, wherein the power variation due to the dynamic means is uniform.

23. A lens according to claim 17, wherein the power function due to the dynamic means is a function of the location on the lens.

24. A lens according to claim 17 wherein the power function established by the static means is suited for desk vision application with a static power change of about 1.0 diopter from low to high viewing angles, and wherein said dynamic means is selectively activatable when the user wishes to look at regions beyond a desk surface.

25. A lens according to claim 17 wherein the power function established by the static means is a function of the viewing angle and suited for a computer-screen-keyboard workstation, and wherein the selection of dynamic power variations is useful for looking at distances beyond the workstation.

26. A lens according to claim 17, wherein the static power function is suitable for far vision at high angles and said dynamic means effects changes in power for near vision at lower viewing angles.

27. A lens according to claim 17, wherein the dynamic means for power variation is achieved via a lens having two transparent membranes, at least one of which is flexible, with a refractive fluid enclosed between the membranes so that power variations occur via means that control the pressure of said fluid.

28. A lens according to claim 27, wherein the static power function is achieved through the shaping of a non-flexible membrane which, together with said flexible membrane, constitutes said two transparent membranes.

29. A lens according to claim 17 wherein the power variation due to the dynamic means is variable in discrete steps.

30. A lens according to claim 17 wherein the power variation due to the dynamic means is variable continuously.

31. An ophthalmic lens comprising:
a) static means for establishing a non-uniform power function for the lens over a selected area of the lens surface; and
b) dynamic means for selectively changing the power function of the lens as an augmentation to the power function established by said static means, such that the actual power of the lens at a given point thereon is the superposition of the power due to said static means and the power due to said dynamic means.

* * * * *